Aug. 14, 1951     A. W. ORR, JR     2,564,127
GAS TURBINE TEMPERATURE CONTROL
Filed May 23, 1947     3 Sheets-Sheet 1

A. W. Orr Jr.
INVENTOR.

BY
ATTORNEY

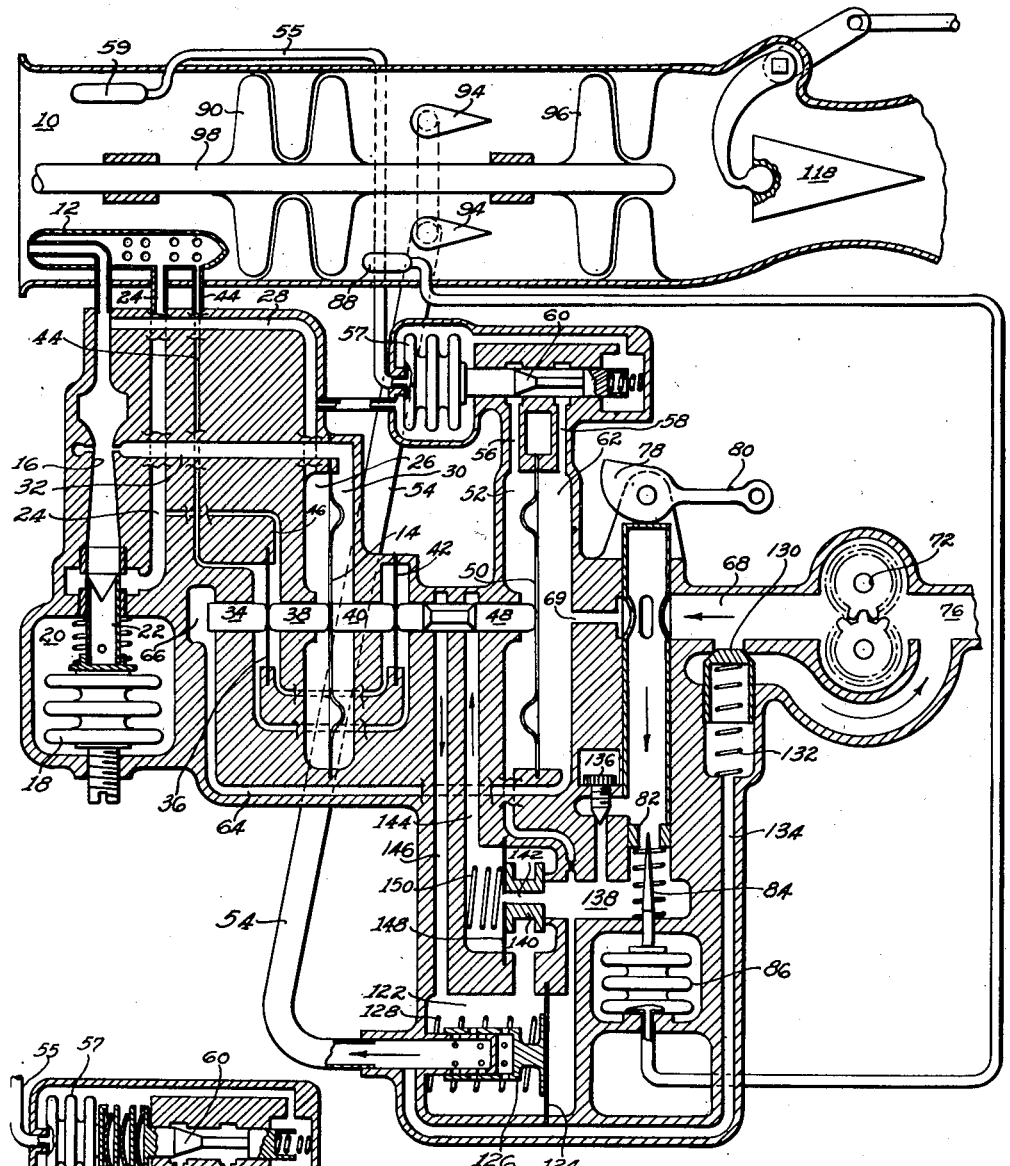

Patented Aug. 14, 1951

2,564,127

UNITED STATES PATENT OFFICE 2,564,127

GAS TURBINE TEMPERATURE CONTROL

Andrew William Orr, Jr., Detroit, Mich., assignor to George M. Holley and Earl Holley Application May 23, 1947, Serial No. 750,016

5 Claims. (Cl. 60—41)

The object of this invention is to control the temperature in a gas turbine.

It is also the object of this invention to control the fuel flow with reference to the air flow in a combustion chamber of an engine.

Fig. 2 shows the control adapted to control the fuel at any selected pitch of the propeller or at any selected position of the cone in the gas outlet.

Fig. 3 shows an alternative temperature correction means to correct both for the temperature of the air and of the fuel.

Figure 1:
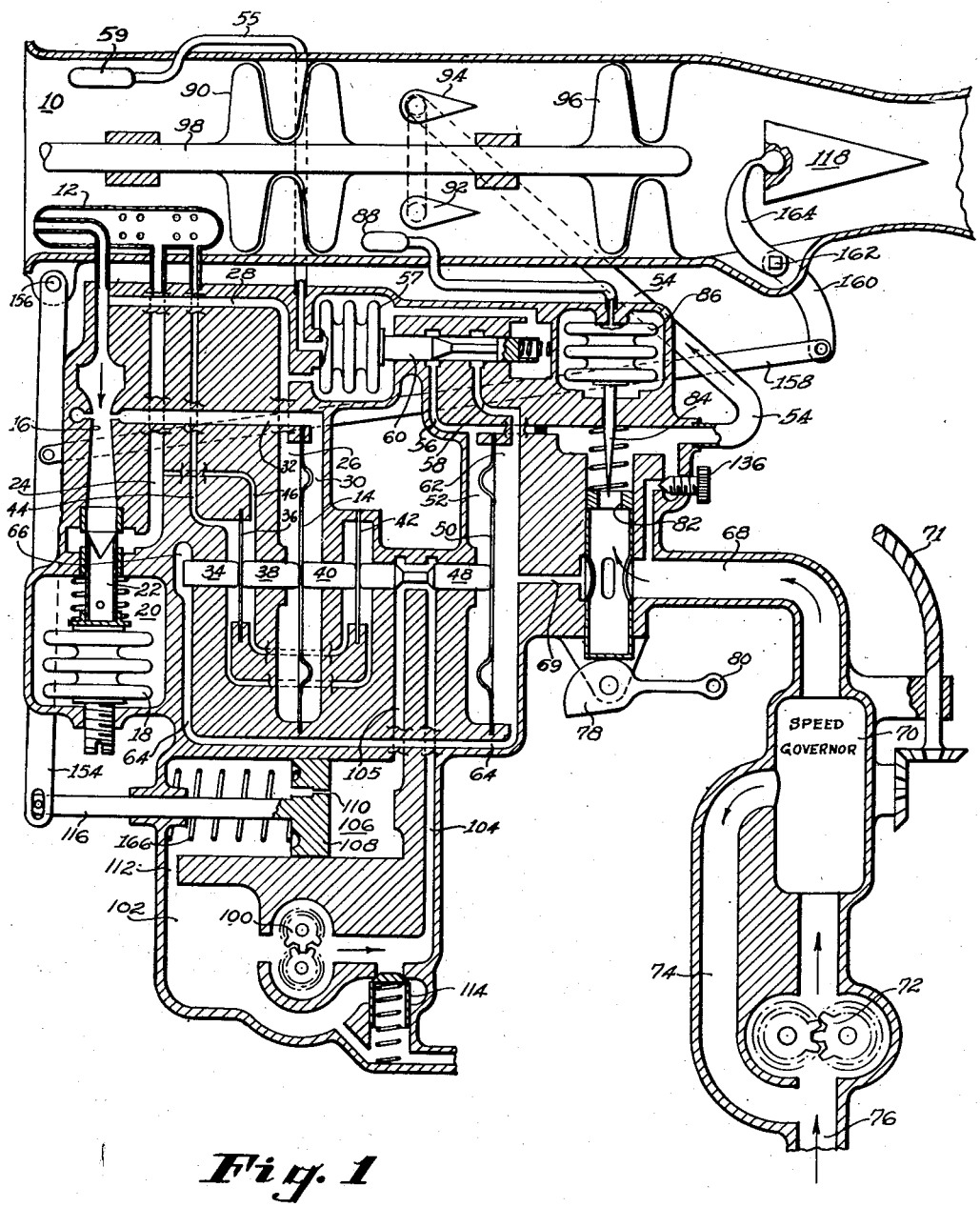
Fig. 1 shows the control adapted to control the load by increasing or decreasing the pitch of the propeller or alternatively decreasing or increasing the area of the conical outlet for the exhaust gases leaving the gas turbine.

In Fig. 1, 10 is the air entrance. 12 is a pitot tube in the air entrance 10. 14 is a diaphragm responsive to the pressure difference derived from the pitot tube 12. 16 is a small venturi connected to the impact pressure side of the pitot tube 12. 18 is a barometric element located in a chamber 20 and controlling a V shaped valve 22 located in the outlet from the venturi 16. 24 is a pipe leading from the valve 22 to the outlet from the venturi 16. 24 is a pipe leading from the valve 22 to the low pressure side of the pitot tube 12. 26 is the chamber to the left of the diaphragm 14 and is connected through the pipe 28 to the impact side of the pitot tube 12. 30 is the chamber to the right of the diaphragm 14 and is connected through the passage 32 to the throat of the small venturi 16.

A small pin 34 engages with the left hand side of the small diaphragm 36. A small pin 38 engages with the right hand side of the small diaphragm 36 and with the left hand side of the large diaphragm 14. 40 is a small pin which engages with the right hand side of the diaphragm 14 and with the left hand side of the small diaphragm 42.

Pipe 44 connects with the low pressure side of the pitot tube 12, with the chamber on the left hand side of the diaphragm 36 and with the right hand side of the diaphragm 42. Pipe 46 connects with the chamber on the right hand side of the small diaphragm 36, with the left hand side of the small diaphragm 42 and with the pipe 24 which communicates with the low pressure side of the pitot tube 12.

Servomotor valve 48 engages with the right hand side of diaphragm 42 and with the left hand side of fuel responsive diaphragm 50. Chamber 52, to the left of diaphragm 50, engages with the pipe 54 which is the main fuel outlet leading to the fuel nozzle. Chamber 52 also communicates with a small pipe 56, past the air inlet temperature valve 60 to the passage 58. Passage 58 connects with the passage 62, to the right of the fuel diaphragm 50. The bellows 57 and the temperature responsive bulb 59 are connected together by the passage 55. The increase in temperature of the bulb 59 thus moves the valve 60 to the right. Passage 64 connects the chamber 62 to the small chamber 66, to the left of the small pin 34. Chamber 62 connects with the outlet passage 68, through the passage 69, leading from the speed governor 70, which speed governor received its fuel from the fuel pump 72. This speed governor is shown driven by a flexible drive shaft 71 which in its turn is driven by the shaft 98 of the gas turbine. Speed governor 70 returns its excess fuel through the fuel bypass 74 to the fuel inlet 76.

A cam 78, moved by the lever 80, raises and lowers the fuel orifice 82. A fuel needle 84, which enters the fuel orifice 82, is positioned relative to the orifice 82 by the bellows 86. The bellows 86 are connected to the temperature bulb 88 which is located in the outlet from the air compressor 90. The fuel flow past the orifice 82, past the fuel needle 84 emerges into the fuel passage 54 and discharges into the fuel nozzle 92—94. This fuel is consumed by the air admitted to the air entrance 10 and compressed by the air compressor 90. The gas turbine 96 is rotated by the fuel burning in the air. The shaft 98 is thereby rotated. The shaft 98 rotates the speed governor 70, through the flexible shaft 71, and the fuel pump 72, and also the oil pump 100 by gears, not shown.

Oil pump 100 takes oil from the oil tank 102 and delivers the oil past the servomotor valve 48 through the pipe 104—105 and directs the oil under pressure to the chamber 106, to the right of the piston 108. Small opening 110, in the piston 108, permits oil to flow back to the tank 102, through the passage 112. Relief valve 114 is provided to limit the pressure in the passage 104.

The rod 116 is connected so that when it moves to the left the pitch of the propeller is automatically increased. Alternatively it is connected so as to move the conical valve 118 to the right. In either case the tendency will be to increase the fuel/air ratio and therefore the temperature will rise. As shown the rod 116 engages with the link 154 which is pivoted on the pin 155. Link 158 connects the lever 154 with the lever 160. Lever 160 is mounted on the shaft 162. Shaft 162 carries the lever 164 which carries the cone 118. Spring 116 engages with the piston 108 which tends to move the cone 118 into the opening direction.

In Fig. 2 similar parts are marked with similar numbers and have the same function.

However, in this case the servomotor valve 48 is connected through the passage 146 to the chamber 122, to the left of the diaphragm 124. Balance valve 126 is carried by the diaphragm 124. A spring 128 pushes the valve 126 to the right, in which position the valve 126 opens and allows fuel to flow up the pipe 54 to the burners 94. In this case there is no speed governor provided and the fuel pump 72 discharges fuel past the pressure relief valve 130 to the fuel orifice 82 and past the fuel needle 84.

The pressure relief valve 130 is partially supported by the spring 132 and also by the pressure in the pipe 54 transmitted through the passage 134 to the underside of the valve 130. Just before the fuel passes the fuel orifice 82 fuel flows past the zero torque fuel adjustment needle 136.

Fuel flows along the passage 138, past the pilot valve 140, to the balance valve 126. Pilot valve 140 is provided with a small opening 142 in its center. The fuel flowing through the small opening 142 flows up along the passage 144, past the servomotor valve 48, down the passage 146 to the chamber 122. Pilot valve 140 is carried by the diaphragm 148, which diaphragm is pushed to the right by the spring 150.

In Fig. 3, between the temperature responsive bellows 57, is inserted temperature responsive Barometric washers 160. The chamber 162 surrounding the bellows 57 is now connected through the passage 164 with the fuel chamber 52.

Figure 4:
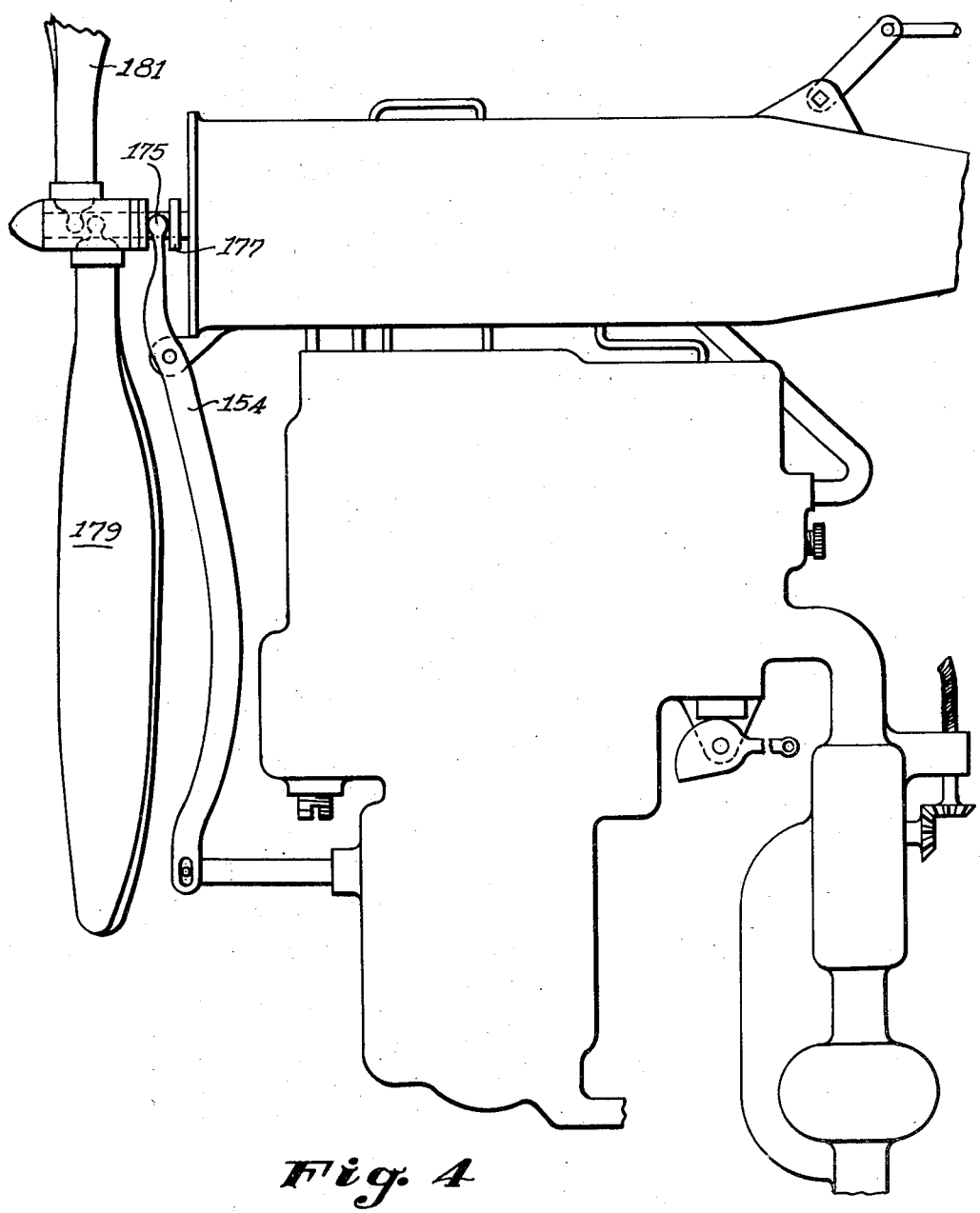
Fig. 4 shows the device controlling a variable pitch propeller.

In Fig. 4 the lever 154, controlled by servovalve 48 of Fig. 1 and slave motor piston 108, controls the lever 175 which is an extension of lever 154. Lever 175 engages collar 177 of the variable pitch propellers 179 and 181.

Operation

In Fig. 1 the cam 78 is placed in a selected position by the pilot. The pressure differences set up by the pitot tube 12 and the small venturi 16 move the servomotor valve 48 to the right. Servomotor valve 48 is moved to the left by the diaphragm 58 which responds to the drop in pressure to the fuel flowing past the restriction 82 and past the needle valve 84.

Servomotor valve 48 controls the position of the piston 108. When the servomotor valve 48 moves into the position shown pump 100 applies pressure to the right hand side of piston 108 pushing the rod 116 to the left. Rod 116 in its turn rotates the lever 154 which causes the lever 160 to also rotate which moves the cone 118 into the direction of closing. When the temperature is too low and more air is admitted, that is more than is called for by the fuel adjustment 78, the valve 48 restricts the flow through the passages 104—105. Piston 108 then returns to the right under the influence of spring 116 and the cone 118 moves into the direction of opening. Servomotor valve 48 thus controls the motion of the slave piston 108.

As a result the cone 118 is adjusted automatically in response to the position of the cam 78. The speed governor 70, when the speed increases, reduces the fuel flow and thus reduces the temperature in the combustion chamber.

In Fig. 2 the variation of fuel flow and the variation in air flow are weighed the one against the other. The weight of the air is determined by the pressure of the air and by the temperature of the air. The pressure of the air is applied to the bellows 18, and the temperature of the air is applied to the bellows 57 so that the valve 48 is adjusted to give the selected fuel/air ratio. When selected, fuel/air ratios will result in a definite increase in temperature when the gases strike the gas turbine 96. However, it is the sum of the temperature of the air entering the combustion chamber plus the temperature rise in the combustion chamber which determines the maximum temperature of the gases striking the gas turbine 96. Hence, the bulb 98, which responds to the temperature of the compressed air, moves the needle 84. As the needle 84 enters the fuel orifice 82 a given flow of fuel causes a bigger pressure drop and therefore pushes the diaphragm 58 to the left. As the servomotor valve 48 moves to the left the valve 140 tends to close and the fuel flow is diminished and equilibrium is reached with a lower fuel/air ratio.

As a result the fuel flow is controlled by the cam 78 to give the desired temperature.

In Fig. 3 when the density of the fuel falls, due to a rise in its temperature, the valve 68 is moved to the left due to the contraction of the elements 160. This maintains the fuel/air ratio constant when the fuel/air ratio is measured on a weight basis. Otherwise when the density of the fuel falls the mixture would tend to get lean.

What I claim is:

1. Temperature selecting means for the combustion chamber of a combustion engine having an engine driven air compressor delivering air to said air compressor, a source of fuel under pressure, a fuel passage, an adjustable fuel restriction therein, manually adjusting means for varying said fuel restriction, temperature responsive means located in the outlet from said air compressor, an additional fuel restricting means also located in said fuel passage, said additional fuel restricting means being adapted to be moved by said temperature responsive means, a fuel outlet from said fuel restricting means leading to said combustion chamber, an air entrance to said air compressor, air flow indicating means located therein, a moving wall responsive to air flow and having a chamber on one side of said moving wall connected to the pressure side of said air indicating means, a chamber on the other side connected to the low pressure side of said air indicating means, a second moving wall, said second moving wall being responsive to fuel flow and having a chamber on one side of said moving wall connected to the pressure upstream of said fuel restriction, a second chamber on the other side of said second moving wall and connected to the low pressure downstream of said fuel restriction, a servomotor valve operatively connected to both moving walls whereby an increase in air flow moves the valve in one direction and an increase in fuel flow moves the valve in the other direction, a slave motor dominated by said servomotor valve, load control means for said engine, mechanism connecting said slave motor to said load control means so that the load is decreased to prevent excessive combustion chamber temperatures.

2. A device as set forth in claim 1 in which there are additional temperature responsive means located in the air entrance to the air compressor, a fuel bypass connecting the chamber on either side of said second moving wall together, a restricting valve in said bypass operating means for said valve connected to said temperature responsive means.

3. A device as set forth in claim 1 in which there is an engine driven speed governor including a speed responsive fuel flow control valve, a fuel entrance to said governor, a fuel exit for said governor connected to said passage so as to reduce the fuel flow to said manually controlled restricting means so as to regulate the engine speed at a preselected speed.

4. A device as set forth in claim 1 in which the air flow indicating means includes a bypass from the pressure to the suction side of said indicating means, a small venturi therein, a passage from the throat of said venturi to the low pressure side of said first moving wall.

5. A device as set forth in claim 1 in which the air flow indicating means include a bypass from the pressure to the suction side of said indicating means, a small venturi in said bypass, a passage from the throat of said venturi to the low pressure side of said first moving wall, a valve restricting the air flow through said venturi, atmospheric pressure responsive means adapted to move said valve in the closing direction at high altitudes.

ANDREW WILLIAM ORR, Jr.

REFERENCES CITED

The following references are of record in the file of this patent:

UNITED STATES PATENTS

| Number | Name | Date |
|---|---|---|
| 2,384,282 | Chandler | Sept. 4, 1945 |